US011451297B2

(12) United States Patent
Maricevic et al.

(10) Patent No.: US 11,451,297 B2
(45) Date of Patent: Sep. 20, 2022

(54) UPSTREAM OPTICAL INPUT POWER AUTO ALIGNMENT IN AN HPON NETWORK (71) Applicant: ARRIS Enterprises LLC, Suwanee, GA (US)

(72) Inventors: Zoran Maricevic, Wallingford, CT (US); Brent D. Arnold, Horsham, PA (US); Zhijian Sun, Wallingford, CT (US); Benny S. Lewandowski, Langhorne, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/117,888

(22) Filed: Dec. 10, 2020

(65) Prior Publication Data
US 2021/0175970 A1     Jun. 10, 2021

Related U.S. Application Data (60) Provisional application No. 62/946,325, filed on Dec. 10, 2019.

(51) Int. Cl.
*H04B 10/2575* (2013.01)
*H04J 14/02* (2006.01)

(52) U.S. Cl.
CPC .... *H04B 10/25751* (2013.01); *H04J 14/0221* (2013.01); *H04J 14/0249* (2013.01)

(58) Field of Classification Search
None
See application file for complete search history.

(56) References Cited

U.S. PATENT DOCUMENTS

| | | | |
|---|---|---|---|
| 2003/0002791 A1* | 1/2003 | Cao | G02B 6/2938 385/37 |
| 2003/0053750 A1* | 3/2003 | Yang | G02B 6/29391 385/27 |
| 2004/0126120 A1* | 7/2004 | Cohen | G02F 1/0115 398/158 |
| 2004/0165857 A1* | 8/2004 | Xiao | H04J 14/0221 385/140 |
| 2015/0304038 A1* | 10/2015 | Schemmann | H04J 14/0278 398/72 |
| 2015/0304040 A1* | 10/2015 | Schemmann | H04N 7/22 398/72 |
| 2015/0304064 A1* | 10/2015 | Mutalik | H04B 10/807 398/48 |
| 2017/0019723 A1* | 1/2017 | Mutalik | H04B 10/2575 |
| 2017/0207852 A1* | 7/2017 | Schemmann | H04B 10/2589 |
| 2018/0262821 A9* | 9/2018 | Mutalik | H04J 14/0221 |

* cited by examiner

*Primary Examiner* — David W Lambert
(74) *Attorney, Agent, or Firm* — Chernoff, Vilhauer, McClung & Stenzel, LLP (57) ABSTRACT

Systems and methods for reducing the variation in the power of optical signals transmitted in an upstream direction, at the inputs of an active combiner in an RFoG CATV architecture preferably configured to reduce optical beat interference, so as to increase the dynamic range of a laser in the active combiner.

10 Claims, 8 Drawing Sheets

| HIGH ONU PARENT OPT I/P | CHILD OPT INPUT TO PARENT | LOW ONU CHILD OPT I/P | MODEM RF Tx DELTA (dB) |
|---|---|---|---|
| 3dBm | 3dBm | 3dBm | 3 |
| 3dBm | 3dBm | 1.5dBm | 6 |
| 3dBm | 3dBm | 0dBm | 9 |
| 3dBm | 0dBm | 3dBm | 9 |
| 3dBm | 0dBm | 1.5dBm | 12 |
| 3dBm | 0dBm | 0dBm | 15 |

UPSTREAM OPTICAL INPUT POWER AUTO ALIGNMENT IN AN HPON NETWORK

CROSS-REFERENCE TO RELATED APPLICATIONS

This application claims the benefit of U.S. Provisional Patent Application Ser. No. 62/946,325 filed Dec. 10, 2019 and entitled "UPSTREAM OPTICAL INPUT POWER AUTO ALIGNMENT IN AN HPON NETWORK" The complete disclosure of the above application is hereby incorporated by reference for all purposes.

BACKGROUND

The present disclosure relates to systems and methods that process signals over a cable transmission network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Cable television (CATV) networks have continuously evolved since first being deployed as relatively simple systems that delivered video channels one-way from a content provider. Early systems included transmitters that assigned a number of CATV channels to separate frequency bands, each of approximately six MHz. Subsequent advancements permitted limited return communication from the subscribers back to the content provider either through a dedicated, small low-frequency signal propagated onto the coaxial network. Modern CATV networks, however, provide for not only a much greater number of channels of content, but also provide data services (such as Internet access) that require much greater bandwidth to be assigned for both forward and return paths. In the specification, the drawings, and the claims, the terms "forward path" and "downstream" may be interchangeably used to refer to a path from a head end to a node, a node to an end-user, or a head end to an end user. Conversely, the terms "return path" "reverse path" and "upstream" may be interchangeably used to refer to a path from an end user to a node, a node to a head end, or an end user to a head end.

Recent improvements in CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A key benefit of RFoG is that it provides for faster connection speeds and more bandwidth than current coaxial transmission paths are capable of delivering. For example, a single copper coaxial twisted pair conductor can carry six simultaneous phone calls, while a single fiber pair can carry more than 2.5 million phone calls simultaneously. Furthermore, coaxial cable, depending on the type/size/conductor) may have tens of dBs of losses per hundreds of feet (and the higher the RF frequency desired, the higher the coaxial cable losses). In HFC networks these losses require placement of in-line RF amplifiers. Conversely, optical FTTP has fewer losses and no need for in-line amplifiers. FTTP also allows consumers to bundle their communications services to receive telephone, video, audio, television, any other digital data products or services simultaneously.

Optical input power levels at an active optical combiner that originate from ONUS in an RFoG architecture may vary considerably, and as these differing power levels are combined in an upstream direction, the dynamic range of the system may be adversely affected. For DOCSIS 3.0-complinat upstream transmissions, the most complex modulation format is QAM64 and this reduction in dynamic range was not typically great enough to affect the operation margins given historical customer usage along with the bandwidth service level offered to customers. But as demand for bandwidth has increased, and service providers are beginning to deploy DOCSIS 3.1, where the most complex modulation format is QAM1024, where the reduction in dynamic range from varying ONU power levels could be problematical. What is desired therefore, are improved systems and methods to increase the dynamic range in RFoG architectures.

DETAILED DESCRIPTION

In traditional RFoG systems, a head end delivers content to an Optical Network Unit (ONU) at a customer's premises through one or more intermediate nodes. An RFoG topology includes an all-fiber service from the head end to the ONU, which is typically located at or near the user's premises. In the head end, a downstream laser sends a broadcast signal that is optically split multiple times through the fiber network. Each ONU terminates the fiber connection at a subscriber-side interface and converts traffic for delivery over the in-home network at the customer premises. Coaxial cable can be used to connect the ONUs of an RFoG network to one or more user devices, where the RFoG user devices can include cable modems, EMTAs, or set-top boxes, as with the user devices of an HFC network.

Along the return path from the subscriber's ONU to the head end, an upstream laser in the ONU delivers return path signals to one or more nodes, which combines them for upstream transmission along fiber length and ultimately to a receiver in the head end. The signals from the respective receivers are then combined in the head end for transmission to a Cable Modem Termination Service (CMTS).

One existing impairment of RFoG communication channels is Optical Beat Interference (OBI), which afflicts traditional RFoG networks. OBI occurs when two or more reverse path transmitters are powered on, and are very close in wavelength to each other. OBI creates noise in the RF domain at the head end receivers 30, and therefore limits upstream traffic, but OBI can also limit downstream traffic.

Figure 1:
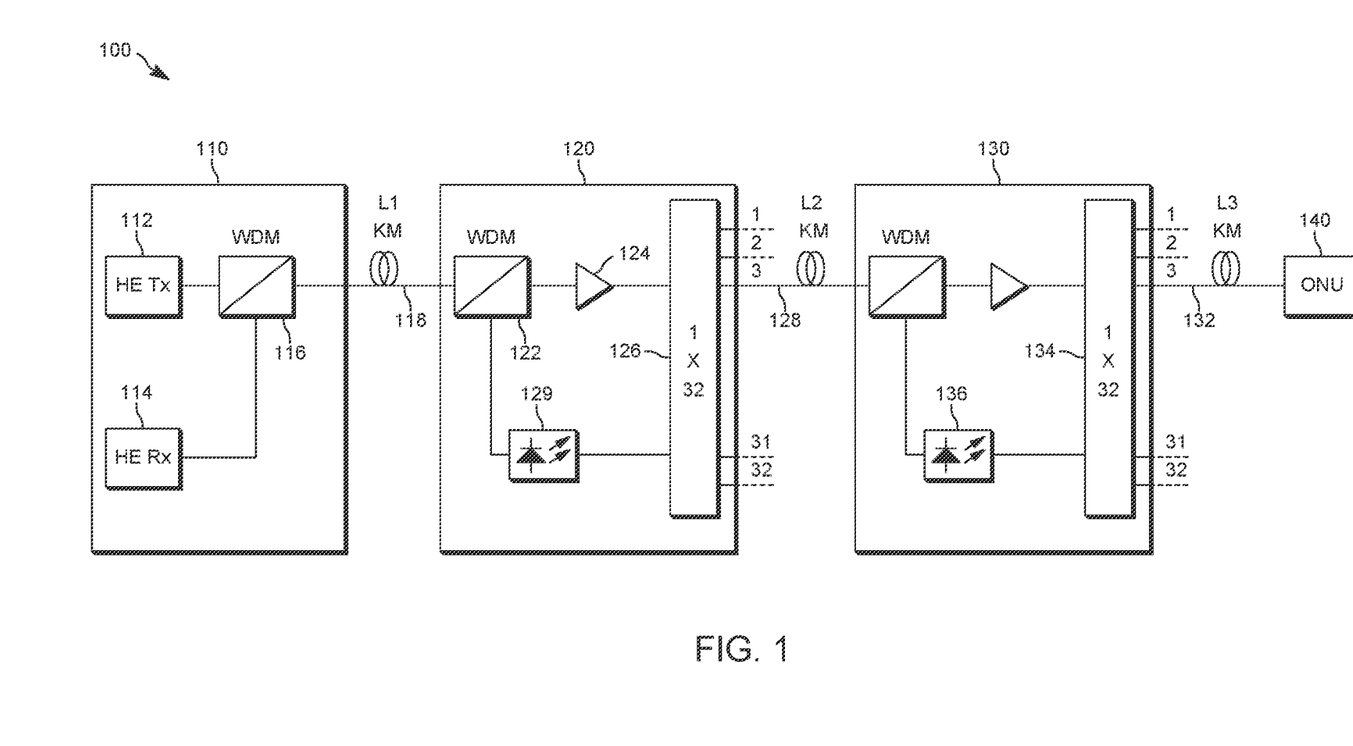
FIG. 1 shows an RFoG architecture that eliminates Optical Beat Interference by using active optical combiners.

FIG. 1 shows a system 100 for delivering CATV content to a plurality of subscribers over an RFoG network that eliminates OBI. This system 100 includes a head end 110 having a transmitter 112 and receiver 114 each connected to a WDM splitter 116 that outputs a signal to, and receives a signal from, a fiber link 118 of L1 km. The fiber link 118 is connected to an active splitter/combiner unit 120. The splitter/combiner unit 120 may preferably include a Wavelength Division Multiplexer (WDM) 122 that separates forward path signals from reverse path signals. The forward path signal from the WDM 122 is provided to an Erbium-Doped Fiber Amplifier (EDFA) 124 that outputs an amplified optical signal to an active 1×32 splitter 126 that has 32 output ports, each to respective second fiber links 128. At each port, the power level can be modest (e.g. in the 0-2 dBm range).

In the reverse direction, the 1×32 port splitter 126 operates as an active combiner 126, and includes, at each port, a WDM that directs upstream light to a detector at the port, which converts received optical signals to electrical signals, amplifies them in the RF domain, and provides the electrical signals to a transmitter 129 that outputs light at, for example, 1610 nm, 1310 nm, or some other appropriate wavelength, provided to the WDM 122, which in turn directs the upstream light into fiber 118. At the head end 110, the fiber 118 is connected to WDM 116 that directs the upstream light to the receiver 114.

Each of the 32 ports of the splitter/combiner 126, through a respective fiber 128, output a respective signal to a second active splitter/combiner unit 130 of the same type and configuration as the splitter/combiner unit 120. The length (s) of the fiber 128 may vary with respect to each other. The output power per splitter port is low, around 0 dBm. The splitter ports are connected to ONUs 140, for instance in a Multiple Dwelling Unit (MDU) or a neighborhood, via fiber 132 of length L3. In a basic RFoG system, the sum of the fiber lengths L1+L2+L3 is up to 25 km. The system 100, however, permits a higher total length of fiber between the head end 110 and the ONUs 140, such as 40 km, because the system 100 can tolerate a higher SNR loss relative to earlier systems.

The upstream signals from the ONU 140 are individually terminated directly at the active splitter/combiner unit 130; even for ONUs operating at 0 dBm, the power reaching the detectors is around −2 dBm, which is almost 20 dB higher than in previous RFoG systems. The received RF signal is re-transmitted via the transmitter 136 along the reverse path into fiber 128 and received and retransmitted by the preceding active splitter/combiner unit 120 and thereafter to the head end 110. Although the repeated re-transmission leads to some incremental reduction in SNR, improvements in SNR from the active architecture provides much greater overall performance relative to earlier RFoG systems. More importantly, because all reverse optical signals are individually terminated at separate detectors, there can be no optical beat interference (OBI) between different reverse signals. The reverse signals are not combined optically, hence OBI cannot occur.

The system shown in FIG. 1 can be referred to as a Hybrid Passive Optical Network (HPON), where transmission of downstream optical signals is electrically passive while transmission of upstream signals is electrically active. Because the present disclosure is concerned with upstream transmissions where the active splitter/combiner units are acting to combine upstream signals received from, e.g. an ONU or another such unit, these units will be referred to as "active combiners." For purposes of the specification and claims, the term "active combiner" refers to a device or receiver that receives an upstream optical signal, converts it to an electrical signal so that it may be electrically amplified or otherwise modified, where the amplified/modified electrical signal then drives a laser or other photo-transmitter to pass the optical signal further along the upstream direction.

Figure 2A:
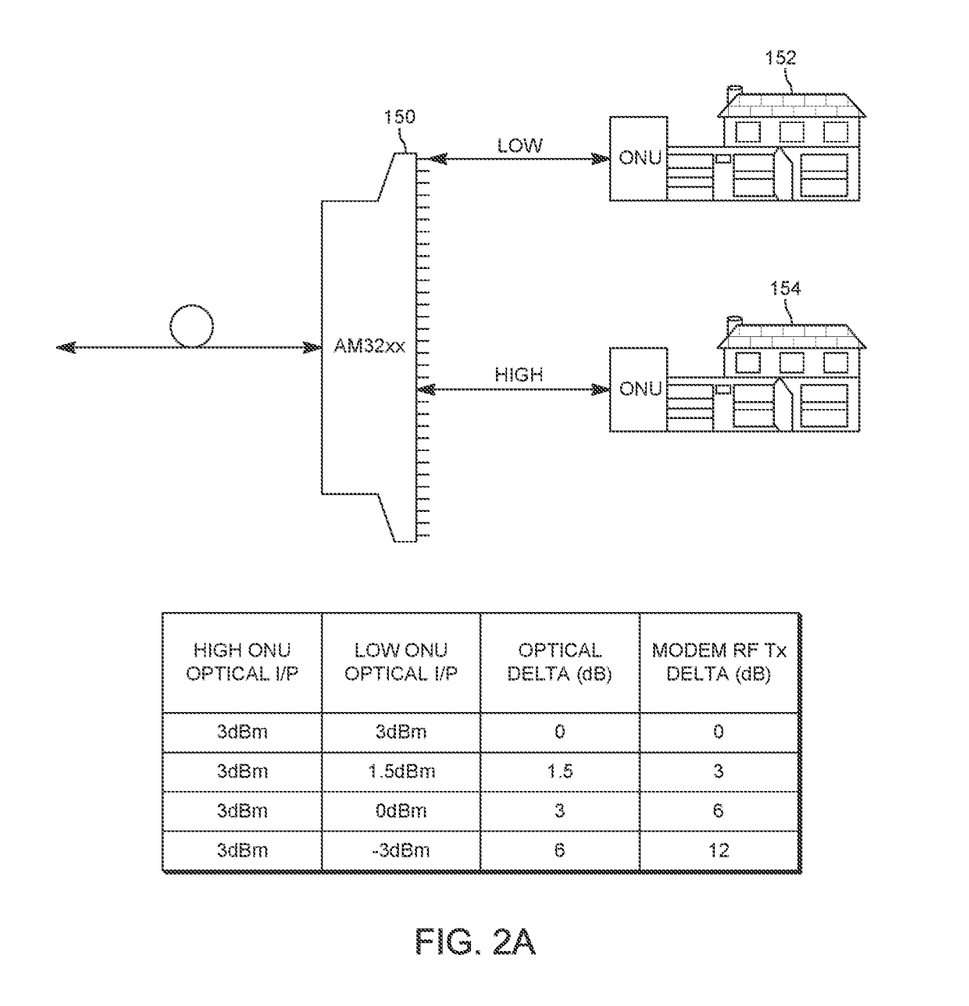
FIG. 2A shows a standalone active optical combiner as shown in FIG. 1 connected to two Optical Network Units (ONUs) and the associated variance in RF levels at the input of the active optical combiner.

When a CMTS is connected to multiple RFoG ONUs through such a system, the RF input level into the CMTS is typically held at a constant level, e.g. 0 dBmV/ch. However, the optical input power level into the ports of each active combiner in the upstream direction can potentially vary from −3 dBm to +3 dBm, which will force the RF drive levels to fluctuate considerably. FIG. 2A, for example, shows an active combiner 150 directly connected to two optical network units 152 and 154. This type of configuration may be be typical of high-density neighborhoods of customers where the active combiner 150 is within five kilometers of the location of the ONUs. As shown in the corresponding table of FIG. 2A, when both ONUs are transmitting at 3 dBm, the power fluctuation at the port of the active combiner 150 is 0 dBm, but when one ONU is transmitting at 3 dBm while the other ONU is transmitting at −3 dBm, the power fluctuation is 12 dB.

Figure 2B:
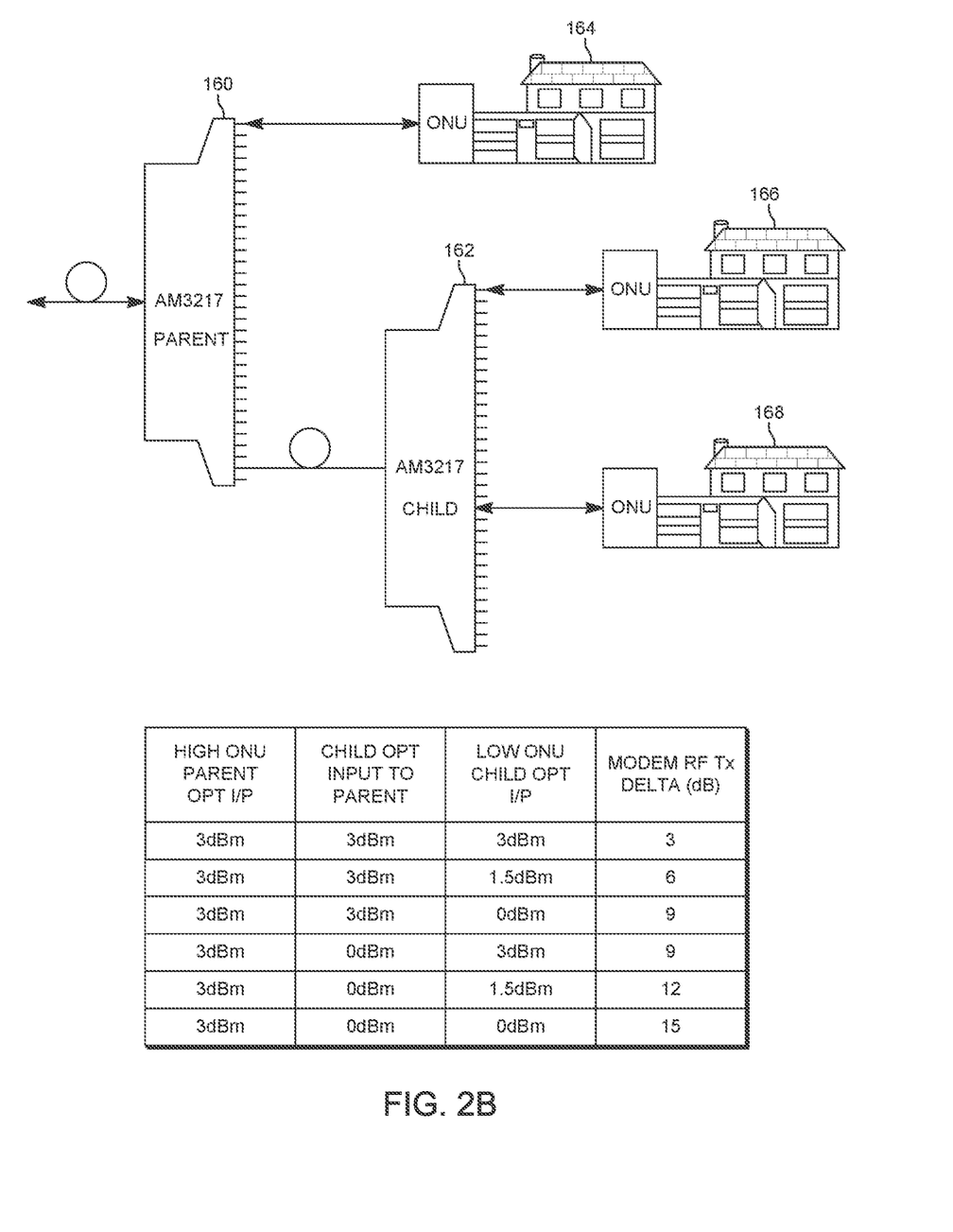
FIG. 2B shows a cascaded configuration of active optical combiners as shown in FIG. 1 connected to a plurality of ONUs, and the associated variance in RF levels at the input of the active optical combiner.

Furthermore, FIG. 2B shows a cascaded configuration where a parent active combiner 160 is connected to a child active combiner 162, and where an ONU 164 is connected to the parent active combiner 160 while two ONUs 166 and 168 are connected to the child active combiner 162. Although these cascaded configurations are sometimes deployed in high-density urban environments to increase the size of a service group, they are also often deployed in rural, low-density environments where the distance between ONUs in a service group varies considerably, and there may be a large distance between a parent active combiner 160 and a child active combiner 162. This cascaded configuration is therefore characterized by larger optical power differences across the input ports of the parent active combiner 162. As seen in the table shown in FIG. 2B, for example, the cascaded configuration may result in as much as a 15 dBm difference in power across the input ports of the parent active combiner 160. Those of ordinary skill in the art will notice that, unlike the table with respect to FIG. 2A, the table of FIG. 2B shows the child ONU having a power variation of only 0 to 3 dBm, rather than −3 to 3 dBm. This is because there is approximately a +/−2 dB RF gain variation among photodiodes, each of which can drive a laser directly. To prevent clipping, the OMI of the ONU laser from a child active combiner is reduced by 3 dB, thus even a photodiode with the highest responsivity (or gain) will not be overdriven.

Figure 3:
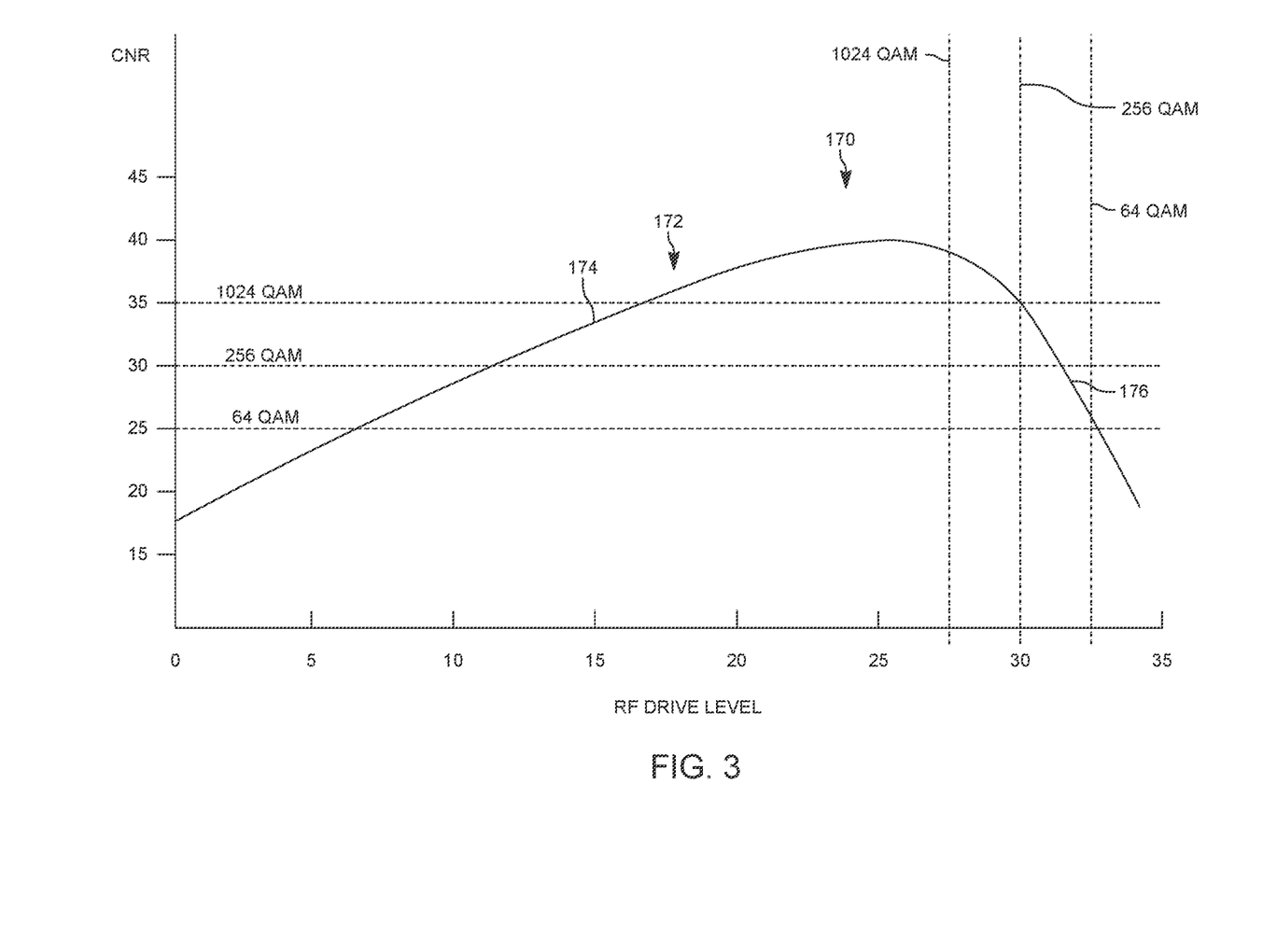
FIG. 3 illustrates the effect on dynamic range of the varying RF levels input from an ONU to one or more active optical combiners.

The optical power differentials shown in FIGS. 2A and 2B are sufficient for delivery of DOCSIS 3.0 service, but will likely not be sufficient for delivery of DOCSIS 3.1 service. FIG. 3 shows an exemplary Noise Power Ratio (NPR) curve 170 that characterizes the dynamic range of a laser with a noise profile 172, expressed as Carrier-to-Noise Ratio (CNR) on the vertical axis as a function of drive power level on the horizontal axis. The left side of the noise profile 170 is characterized by a linear segment where CNR improves as drive level increases. This left side 174 of the noise profile is where CNR is limited by system noise components such as shot noise, thermal noise and relative intensity noise (RIN). Shot noise results from the fact that the number of photons physically emitted by a laser varies randomly by a small amount, but such variation becomes less significant the more intense the power emitted by the laser. Thermal noise results from the temperature-related agitation of electrons in the drive circuitry of a laser, irrespective of the applied voltage. Relative intensity noise is an instability in the power level of a laser, which can result from cavity vibrations, fluctuations in the laser gain medium or from intensity noise transferred from a pump source. These noise sources do not increase proportionally with the power of a laser, so the higher the drive level, the higher the CNR.

The right side 176 of the noise profile 170, however, exhibits a sharp drop-off that results from laser clipping, where the signal being transmitted exceeds the upper or lower limits of what the laser can transit. Clipping noise is exacerbated by operating a laser in burst mode. When a laser receives a signal prior to the time that the laser has fully reached the bias point needed to accommodate the full amplitude of the signal, that signal can easily clip the laser's output. Moreover, the low frequency noise created by operating the laser in burst mode can itself readily overdrive the laser and cause laser clipping.

For DOCSIS 3.0 service, the lower modulation orders and the fact that the DOCSIS 3.0 standard limits the number of simultaneous upstream transmissions means that current variations in upstream ONU drive levels would not be expected to hinder performance. For example, a data modulation of 64 QAM typical for DOCIS 3.0 transmissions requires only 24 dB SNR, and the numerical limit on simultaneously transmitting upstream modems means that upstream transmissions typically do not encompass the full available spectrum, which leaves more dynamic range to prevent clipping. However, the DOCSIS 3.1 standard supports QAM levels up to 1024 QAM, which requires an SNR ratio of 35.5 and the available dynamic range to prevent clipping (approximately 10 dB) is insufficient to support the 12-15 dB power differences described above with respect to FIGS. 2A and 2B. Moreover, the DOCSIS 3.1 standard allows up to forty modems to transmit simultaneously, which will degrade the left side 174 the NPR curve shown in FIG. 3, limiting dynamic range of the system.

The present disclosure provides systems and methods that effectively reduce the requirement on the NPR dynamic range for a typical upstream laser, therefore, make it possible for QAM1024 operation in the field. Generally speaking, the present disclosure describes systems and methods that detect the optical power levels at the input ports to an active combiner, such as the combiner 120 or 130 shown in FIG. 1, and based on the differences in the power levels detected, attenuates one or more of the input signals to reduce the difference in power levels at the respective inputs.

Figure 4:
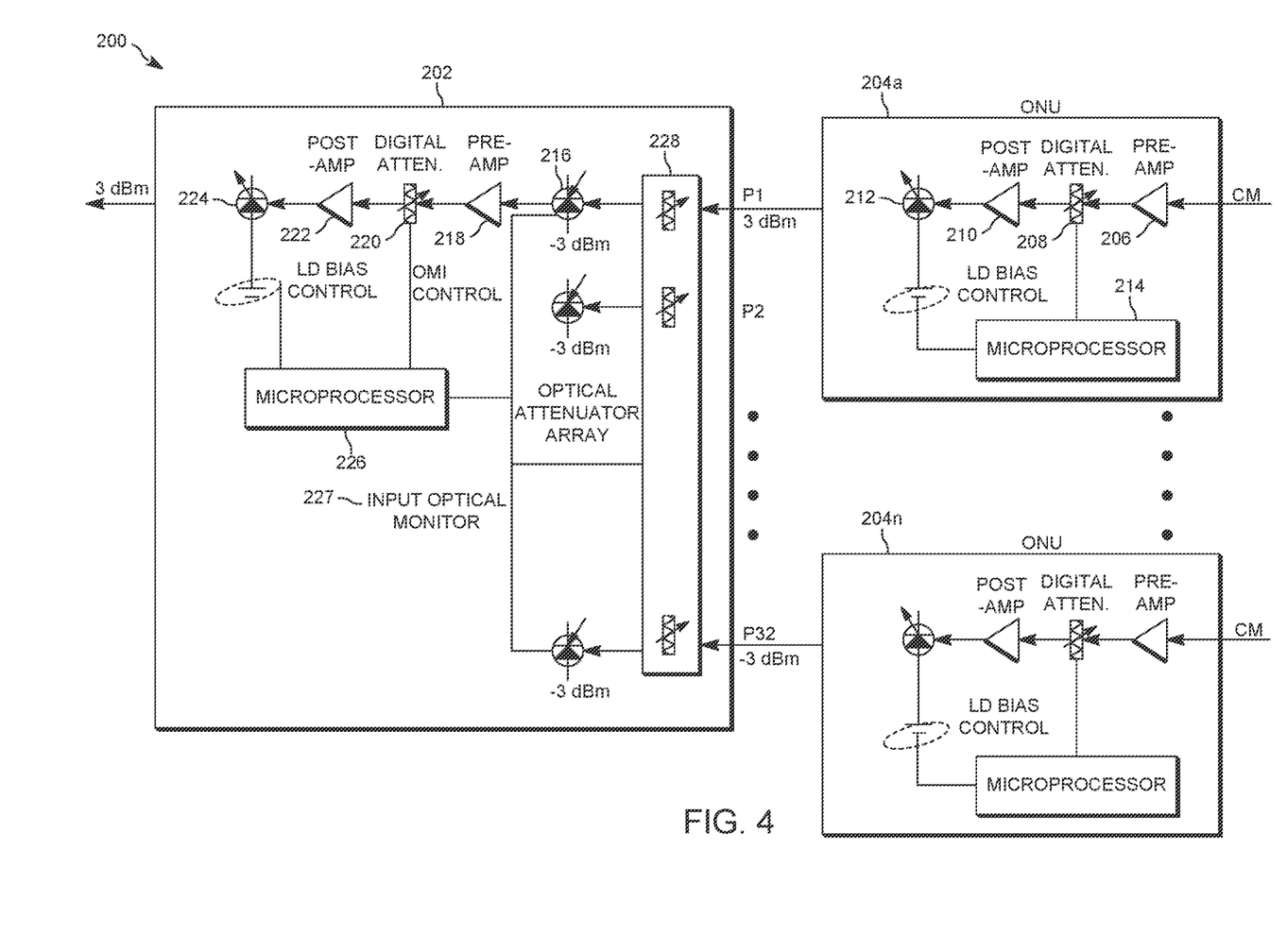
FIG. 4 shows a first embodiment of an improved active combiner in a standalone configuration.
Figure 5:
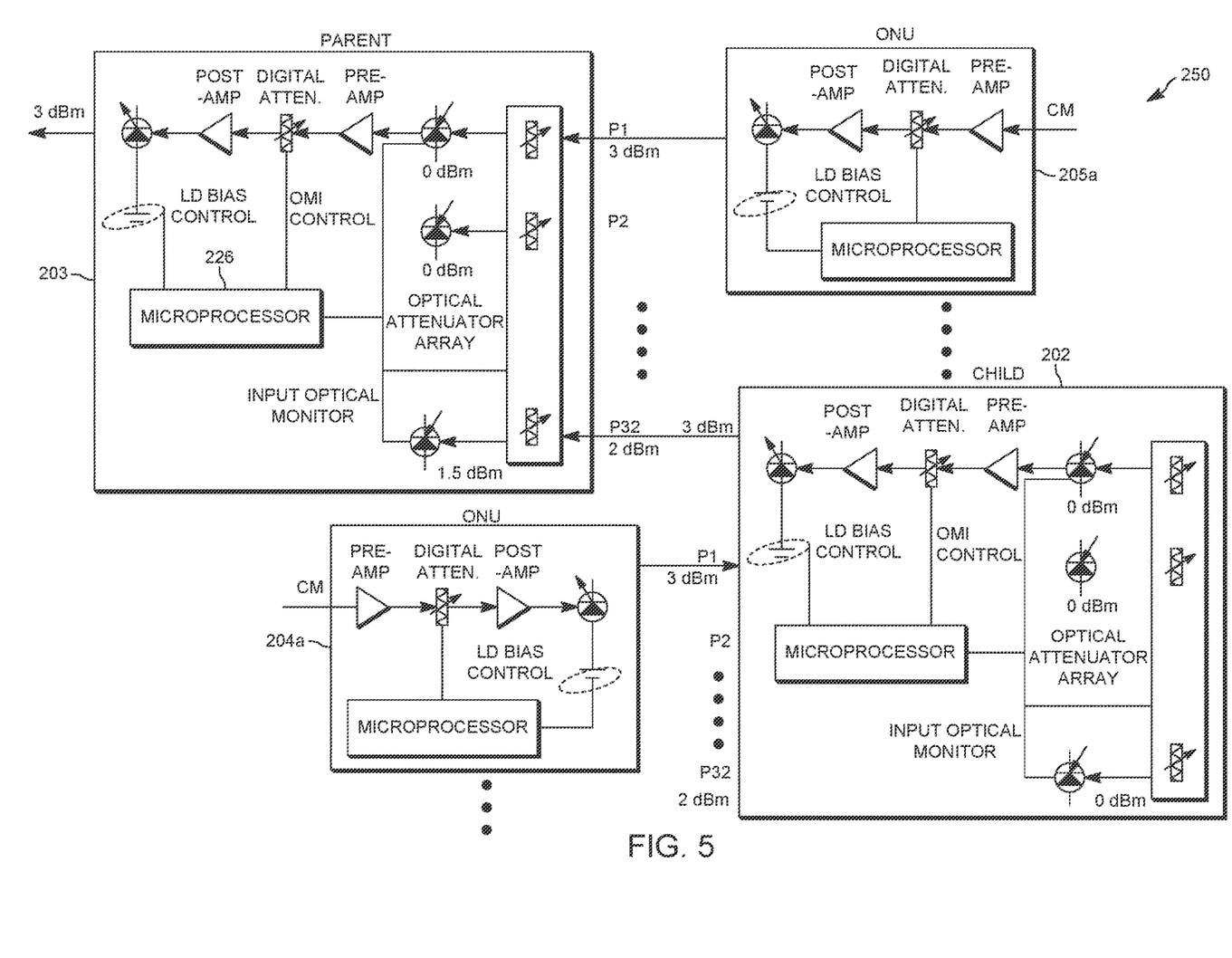
FIG. 5 shows the first embodiment of the improved active combiner in a cascaded configuration.

FIGS. 4 and 5 illustrate a first variation of such systems and methods. Referring to FIG. 4, a system 200 may comprise an active combiner 202 connected to a plurality of ONUs 204a to 204n. Each ONU 204a to 204n preferably receives an input electrical signal from a cable modem (not shown) and amplifies the signal with a pre-amplifier 206, at the output of which is a digital variable attenuator 208 capable of attenuating the output of the pre-amplifier 206. The output of the variable attenuator 208 is passed to a post-amplifier 210 used to drive a laser 212 that outputs an optical signal to the active combiner 202. The digital attenuator is controlled by a microprocessor 214, which drives the attenuator to produce a laser output with as high an optical modulation index (OMI) as is possible. The OMI of a laser signal measures the degree to which the modulation signal affects the light output, i.e. the OMI is used to set the optimum operating point that provides the best tradeoff between noise (under-modulation) and distortions (over-modulation). The microprocessor 214 also controls the bias point of the laser 212 given the amplitude of the driving signal for the laser 212.

The active combiner 202 in turn receives the upstream optical signals from the respective ONUs 204a to 204n and converts them to electrical signals via an array of photodiodes 216, where, like the ONUs 204a to 204n, the electrical output of the photodiodes is passed through a pre-amplifier 218, a variable digital attenuator 220, and a post-amplifier 222 before being used to drive the active combiner's upstream laser 224. Also like the ONUs 204a to 204n, the active combiner 202 has a microprocessor 226 that controls the OMI and the bias of the laser 226. The active combiner 202 preferably includes an optical monitor 227 capable of monitoring the magnitude of the power of the upstream optical signal at each of the respective input ports of the active combiner 202, and also preferably includes an array of variable optical attenuators 228 by which the optical input at each of the ports of the active combiner 202 may be individually attenuated. The microprocessor 226 preferably receives information from the optical monitor 227 relating to the optical power present at each of the input ports, and based on that information selectively attenuates one or more of the input optical signals so as to reduce the difference in optical power across the input ports of the active combiner 202.

With the optical input power auto-leveling, the RF drive level into CMs are kept constant. If there is no optical input power auto-leveling, such as in FIGS. 2A and 2B, the RF drive level into CMS will vary by 12 to 15 dB, which means the requirement for the NPR dynamic range will be 12 to 15 dB wider than the case with optical auto-leveling. The active combiner 202 therefore exhibits improved performance, e.g. bandwidth relative to existing active combiners. In a preferred embodiment, the microprocessor 226 adjusts the optical power at selective input ports so that all ports have exactly same optical input power. Moreover, in some embodiments, the microprocessor 226 preferably adjusts the OMI of the laser 224 based on the final optical input power. In some preferred embodiments, the array of variable optical attenuators 228 preferably comprises a plurality of 16-channel optical attenuators. Also, in some preferred embodiments, the lasers 212 and 224 are driven in continuous mode.

FIG. 5 shows a system 250 in a cascaded configuration where the active combiner 202, with its associated downstream ONUs 204a to 204n is a child to a parent active combiner 203, with its own associated downstream ONUs 205a etc. In the system 250, the child active combiner 202 behaves in the manner described with respect to FIG. 4. The parent active combiner 203 behaves in the same manner as the active combiner 202 with respect to its connected ONUs 205a etc., i.e. it attenuates the power of selective inputs to reduce or preferably equalize the difference in optical power at the inputs from the ONUs, but with respect to the optical input from the child optical combiner 202, the microprocessor 226 adjusts the input power to be approximately 1.5 dB higher than any of the other inputs. Thus, assuming a preferred embodiment where the optical inputs to the parent combiner 203 from the ONUs 205a were equalized, all ONUs in the system 250 would have the same RF link gain. The upstream laser inside each active optical combiner is slowly amplitude modulated, therefore, when a parent active optical combiner receives optical input from a child active optical combiner, it will know it is from an active optical combiner, not from an ONU.

Figure 6:
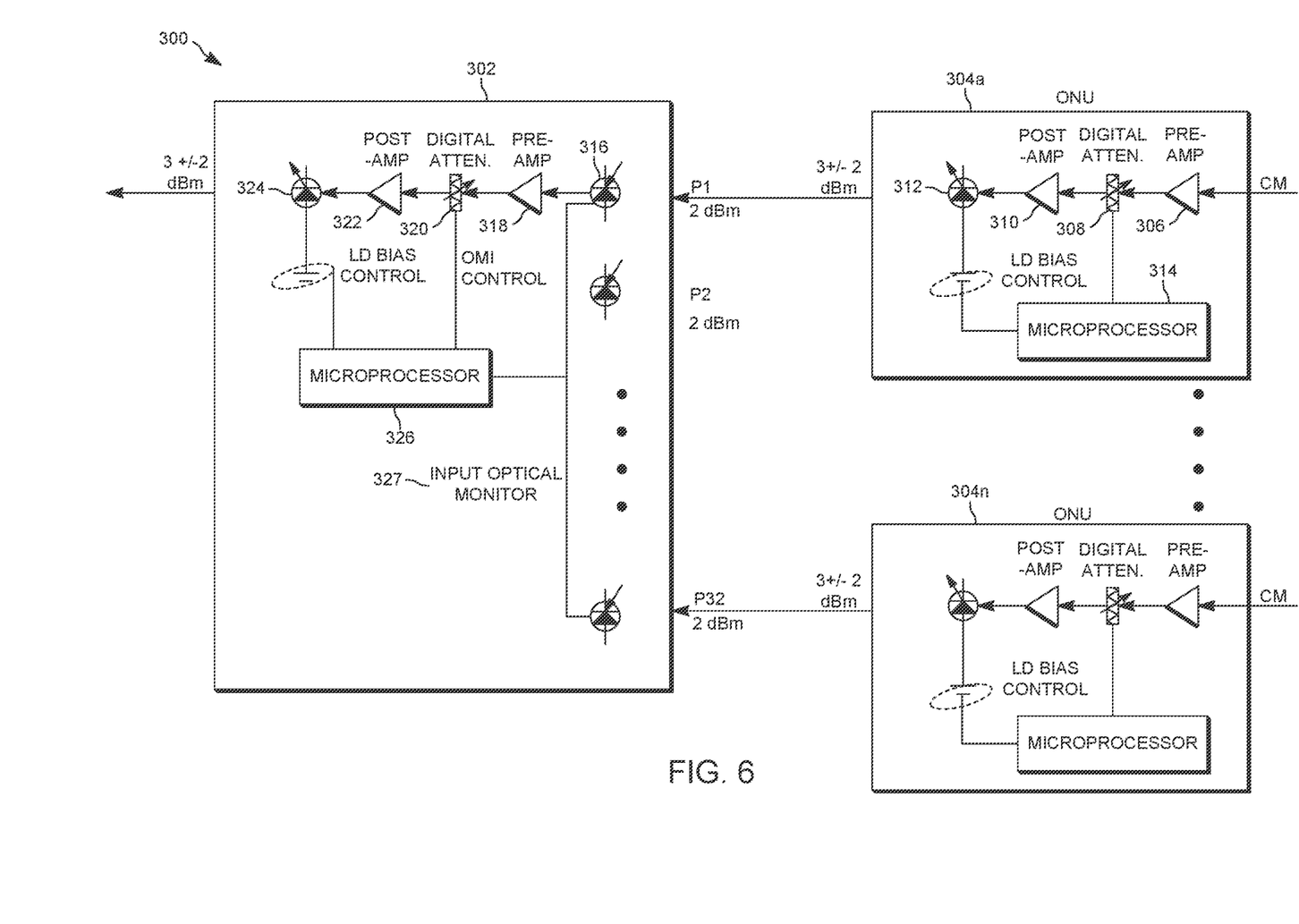
FIG. 6 shows a second embodiment of an improved active combiner in a standalone configuration.
Figure 7:
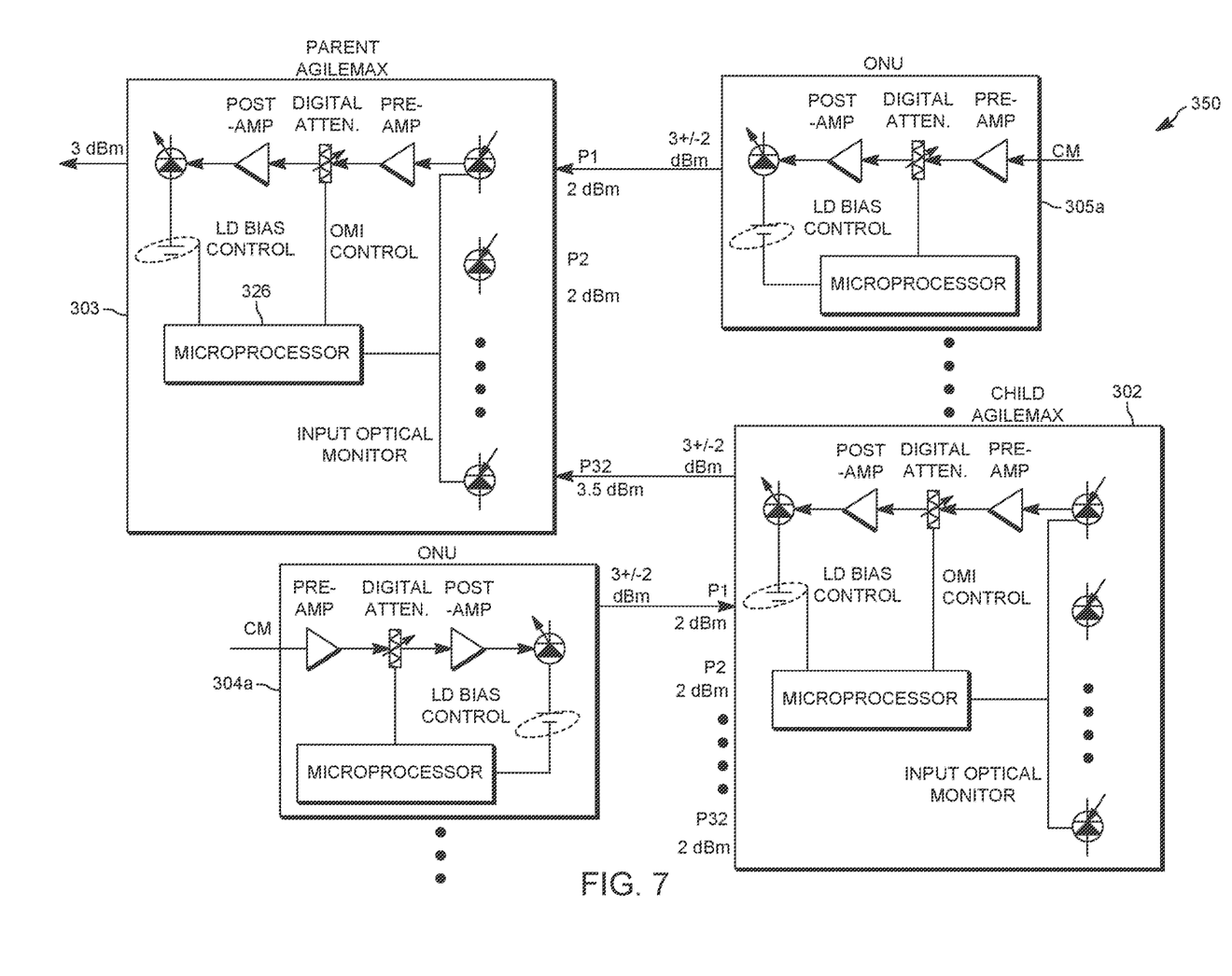
FIG. 7 shows the second embodiment of the improved active combiner in a cascaded configuration.

FIGS. 6 and 7 illustrate a second variation of such systems and methods. Referring to FIG. 6, a system 300 may comprise an active combiner 302 connected to a plurality of ONUs 304a to 304n. Each ONU 304a to 304n preferably receives an input electrical signal from a cable modem (not shown) and amplifies the signal with a pre-amplifier 306, at the output of which is a digital variable attenuator 308 capable of attenuating the output of the pre-amplifier 306. The output of the variable attenuator 308 is passed to a post-amplifier 310 used to drive a laser 312 that outputs an optical signal to the active combiner 302. The digital attenuator is controlled by a microprocessor 314, which drives the attenuator to produce a laser output with a proper optical modulation index (OMI). The microprocessor 314 also controls the bias point of the laser 312 given the amplitude of the driving signal for the laser 312.

The active combiner 302 in turn receives the upstream optical signals from the respective ONUs 304a to 304n and converts them to electrical signals via an array of photodiodes 316, where, like the ONUs 304a to 304n, the electrical output of the photodiodes is passed through a pre-amplifier 318, a variable digital attenuator 320, and a post-amplifier 322 before being used to drive the active combiner's upstream laser 324. Also like the ONUs 304a to 304n, the active combiner 302 has a microprocessor 326 that controls the OMI and the bias of the laser 326. The active combiner 302 preferably includes an optical monitor 327 capable of monitoring the magnitude of the power of the upstream optical signal at each of the respective input ports of the active combiner 302. The microprocessor 326 preferably receives information from the optical monitor 327 relating to the optical power present at each of the input ports, and based on that information selectively attenuates one or more of the input optical signals so as to reduce the difference in optical power across the input ports of the active combiner 302.

Because the active combiner 302 does not have its own attenuator array, in order to attenuate or equalize the optical power across its inputs, the microprocessor 326 preferably controls the output of the lasers 312 in the ONUs 304a to 304n. In come embodiments, control signals may be sent to the ONUs 304a to 304n through a two-way EMS link. Since the laser output of the ONUs 304a to 304n may only be adjusted by 4 dB, the maximum improvement for the RF link gain is only 8 dB, unlike the first variation described with respect to FIGS. 4 and 5, where the RF link gain in each port may be always the same. Thus, as shown in FIG. 6, the optical power at the input ports of the active combiner 302 is preferably equalized to 2 dBm. In some embodiments, the microprocessor 326 preferably adjusts the OMI of the lasers 312 and 324 based on the final optical input power. Also, in some preferred embodiments, the lasers 312 and 324 are driven in continuous mode.

FIG. 7 shows a system 350 in a cascaded configuration where the active combiner 302, with its associated downstream ONUs 304a to 304n is a child to a parent active combiner 303, with its own associated downstream ONUs 305a etc. In the system 350, the child active combiner 302 behaves in the manner described with respect to FIG. 6. The parent active combiner 303 behaves in the same manner as the active combiner 302 with respect to its connected ONUs 305a etc., i.e. it attenuates the power of selective inputs to reduce or preferably equalize the difference in optical power at the inputs from the ONUs, but with respect to the optical input from the child optical combiner 302, the microprocessor 326 adjusts the input power to be approximately 1.5 dB higher than any of the other inputs. Thus, assuming a preferred embodiment where the optical inputs to the parent combiner 203 from the ONUs 205a were equalized at 2 dBm, all ONUs in the system 250 would have the same RF link gain.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. An active combiner comprising:
a plurality of input ports each configured to receive an upstream optical signal having a respective magnitude of optical power, a first plurality of ONUs directly connected to the active combiner through respective ones of the plurality of input ports, and a second active combiner connected to the active combiner through a respective one of the plurality of input ports, the active combiner receiving upstream optical signals from a second plurality of ONUs indirectly through the second active combiner; and
a processor operatively connected to each of the plurality of input ports and capable of reducing a difference in the magnitude of optical power across the plurality of input ports by selectively operating an array of variable attenuators positioned between the plurality of input ports and an array of photodiodes that convert optical power at the plurality of input ports to electrical power; where
the processor is configured to set the optical power at the input port connected to the second active combiner to a magnitude equal to a fixed threshold above that of the input ports connected to the first plurality of ONUs.

2. The active combiner of claim 1 where the processor equalizes the difference in the magnitude of optical power across the plurality of input ports receiving signals from the first plurality of ONUs.

3. The active combiner of claim 1 where the fixed threshold is 1.5 decibels.

4. The active combiner of claim 1 where the processor controls the Optical Modulation Index (OMI) of a laser of each of a plurality of ONUs using a two-way Element Management System (EMS) link.

5. A method implemented by a processor operatively connected to an active combiner in a communications network, the method comprising:
receiving respective first upstream optical signals from each of a plurality of first input ports of the active combiner, each respective upstream optical signal from a respective one of a plurality of first ONUs and each having a respective magnitude of optical power;

receiving a second upstream optical signal from a second input port connected to a second active combiner, the second upstream optical signal being a combined signal from a plurality of second ONUs; and reducing a difference in the magnitude of optical power across the plurality of input ports by selectively operating an array of variable attenuators positioned between the plurality of input ports and an array of photodiodes that convert optical power at the plurality of input ports to electrical power; where the processor is configured to set the optical power at the input port connected to the second active combiner to a magnitude equal to a fixed threshold above that of the input ports connected to the plurality of first ONUs.

6. The method of claim 5 including the step of equalizing the difference in the magnitude of optical power across the plurality of first input ports.

7. The method of claim 5 where the fixed threshold is 1.5 decibels.

8. The method of claim 5 where the processor controls the OMI of a laser of each of a plurality of ONUS using a two-way EMS link.

9. An active combiner comprising:
 a plurality of input ports each connected to a respective one of a first plurality of ONUs and each configured to receive an upstream optical signal having a respective magnitude of optical power; and
 a processor operatively connected to each of the plurality of input ports and capable of reducing a difference in the magnitude of optical power across the plurality of input ports; where
 the processor is configured to set the optical power at an input port connected to a second active combiner to a magnitude equal to a fixed threshold above that of input ports connected to the first plurality of ONUs.

10. The active combiner of claim 9 where the fixed threshold is 1.5 decibels.

* * * * *